US011225906B2

(12) United States Patent
Evain et al.

(10) Patent No.: US 11,225,906 B2
(45) Date of Patent: Jan. 18, 2022

(54) DEVICE FOR MAINTAINING AT LEAST ONE COOLING TUBE ON A TURBOMACHINE CASING AND THE MOUNTING METHOD THEREOF

(71) Applicant: SAFRAN AIRCRAFT ENGINES, Paris (FR)

(72) Inventors: Gael Frederic Claude Cyrille Evain, Moissy-Cramayel (FR); Franck Robert Drouet, Moissy-Cramayel (FR); Olivier Arnaud Fabien Lambert, Moissy-Cramayel (FR); Paul Georges Rodrigues, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 167 days.

(21) Appl. No.: 16/799,724

(22) Filed: Feb. 24, 2020

(65) Prior Publication Data
US 2020/0271057 A1 Aug. 27, 2020

(30) Foreign Application Priority Data
Feb. 25, 2019 (FR) ...................................... 1901905

(51) Int. Cl.
*F02C 7/18* (2006.01)
*F01D 25/12* (2006.01)

(52) U.S. Cl.
CPC ................ *F02C 7/18* (2013.01); *F01D 25/12* (2013.01); *F05D 2260/201* (2013.01)

(58) Field of Classification Search
CPC .. F05D 2260/30; F05D 2260/201; F02C 7/18; F01D 25/12; F01D 25/28; F01D 11/24
See application file for complete search history.

(56) References Cited

U.S. PATENT DOCUMENTS 7,857,264 B2 * 12/2010 Carter ....................... F16L 3/04
248/65
9,341,074 B2 * 5/2016 Schimmels ............. F01D 25/12
(Continued)

FOREIGN PATENT DOCUMENTS

FR 2995022 A1 3/2014
FR 3002590 A1 8/2014
(Continued)

OTHER PUBLICATIONS

Preliminary Research Report received for French Application No. 1901905, dated Sep. 24, 2019, 3 pages (1 page of French Translation Cover Sheet and 2 pages of original document).

*Primary Examiner* — Courtney D Heinle
*Assistant Examiner* — Andrew Thanh Bui
(74) *Attorney, Agent, or Firm* — Womble Bond Dickinson (US) LLP

(57) ABSTRACT

The invention relates to a device (100) for maintaining at least one cooling tube (T) outside a turbomachine casing (19), comprising:
a support (1), comprising an inner face turned towards the tube (T) and at least one left tab (12) for partially retaining towards the left of the tube (T), located on the side of this inner face and fastened thereto,
a support (2), comprising an inner face turned towards the tube (T) and at least one right tab (22) for partially retaining towards the right the tube (T), located on the side of this inner face and fastened thereto,
means (13) for fastening the support (1) to a flange (BAM) of the casing (19),
means (23) for fastening the support (2) to a flange (BAV) of the casing (19), distinct from the means (13).

12 Claims, 11 Drawing Sheets

(56) References Cited

U.S. PATENT DOCUMENTS

Figure 1:
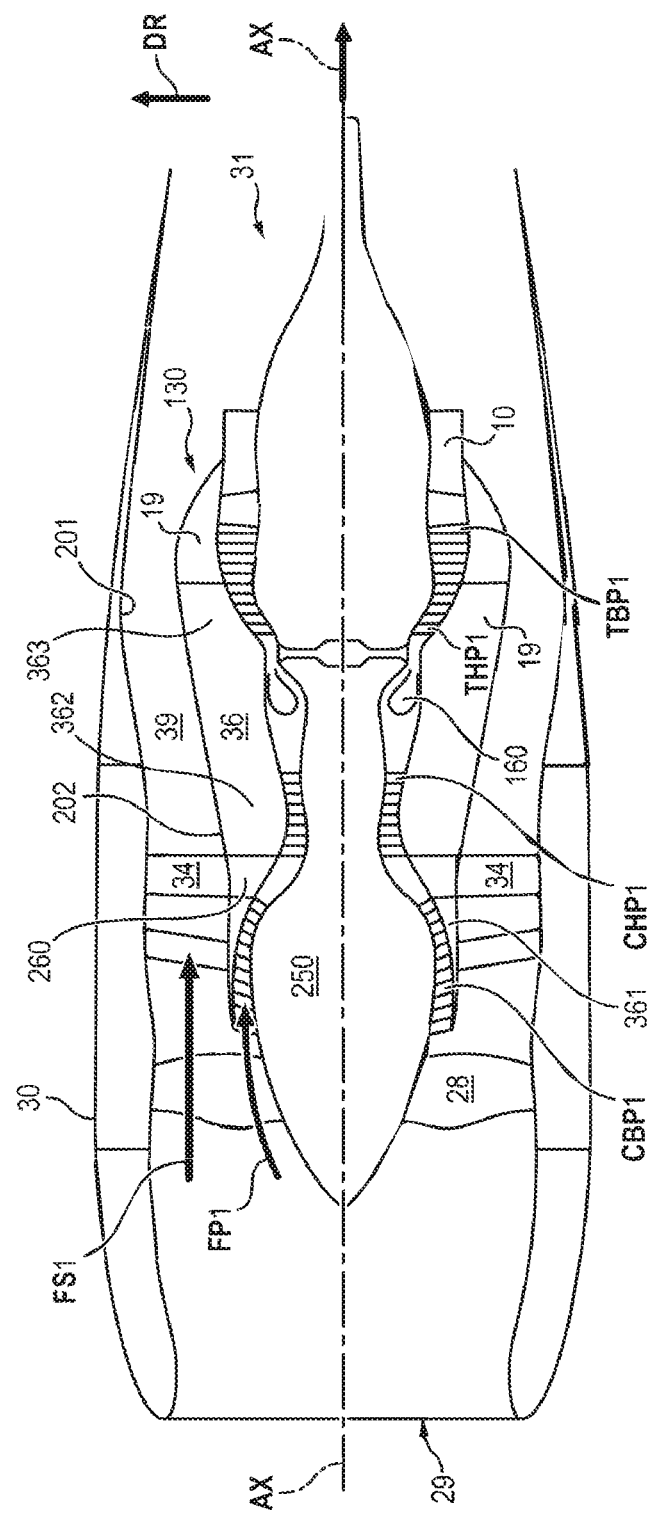

| | | | |
|---|---|---|---|
| 10,077,677 B2* | 9/2018 | Prestel | F01D 11/24 |
| 10,458,281 B2* | 10/2019 | Tripodina | F01D 25/28 |
| 11,098,613 B2* | 8/2021 | Durand | F02C 7/18 |
| 2015/0345328 A1 | 12/2015 | Prestel | |
| 2016/0003088 A1 | 1/2016 | Cohin et al. | |
| 2018/0216488 A1 | 8/2018 | Bunel et al. | |

FOREIGN PATENT DOCUMENTS

| | | | |
|---|---|---|---|
| FR | 3021700 A1 | 12/2015 | |
| FR | 3040429 A1 | 3/2017 | |

* cited by examiner

DEVICE FOR MAINTAINING AT LEAST ONE COOLING TUBE ON A TURBOMACHINE CASING AND THE MOUNTING METHOD THEREOF

The invention relates to a device for maintaining at least one cooling tube on a turbomachine casing, as well as to a method for mounting the latter.

One field of application relates to the aircraft turbojet engines.

The casing can be that of a low-pressure turbine of the turbomachine. The cooling tube is also called cooling ramp. Usually, several cooling tubes are provided. The cooling device is fastened relative to the outer surface of the casing to maintain the cooling tube(s) therearound, so as to cool it in the most uniform manner.

Various maintaining devices of this type are known.

Document FR-A-3 040 429 relates to a fastening device comprising a support having an internal blade and an external blade each having grooves each surrounding one half of the circumference of the cooling ramps, planar areas of the sheets being assembled by screws on support elements fastened to the casing.

Document FR-A-2 995 022 relates to a fastening device comprising a fastening sheet comprising recesses on which fastening collars surrounding the cooling tubes are fastened.

Document FR-A-3 021 700 relates to a fastening device comprising two plates fastened together by spacers defining gaps therebetween in which the cooling tubes pass.

Document FR-A-3 002 590 relates to a fastening device comprising a fastening sheet having openings and outer lugs on which fastening collars are fastened, the fastening collars surrounding the cooling tubes and passing through the openings.

In general, the maintaining device creates a cantilever over the cooling tubes, which must be supported in order to best control the air-gap between the cooling tubes and the outer surface of the casing over the entire periphery thereof.

The invention aims at obtaining a device for maintaining at least one cooling tube on a turbomachine casing, as well as a method for mounting the latter, that allow reducing the air-gap between the tube and the casing and improving the cooling.

To this end, a first subject matter of the invention is a maintaining device for maintaining at least one air jet cooling tube, the air jet cooling tube being intended to cool an outer surface of a turbomachine casing, characterized in that the maintaining device comprises a first support, comprising a first inner face turned towards the air jet cooling tube and at least one left tab for partially retaining towards the left the air jet cooling tube, located on a side of the first inner face and fastened thereto, a second support, comprising a second inner face turned towards the air jet cooling tube and at least one right tab for partially retaining towards the right the air jet cooling tube, located on a side of the second inner face and fastened thereto, first fastening means for fastening the first support to a first flange of the turbomachine casing, second fastening means for fastening the second support to a second flange of the turbomachine casing, the second fastening means being distinct from the first fastening means.

Thanks to the invention, the presence of collars or portions passing under the cooling tube is eliminated, which allows reducing the bulk under the tube and bringing the tube closer to the outer surface of the casing. A reduction in the air-gap between the cooling tube and the outer surface of the casing is thus achieved, without risking contact between the tabs and the casing. In addition, the invention also allows reducing the total mass of the maintaining device. The invention also allows less sealing the bores of the tubes sending air jets towards the outer surface of the casing.

According to one embodiment of the invention, the left tab is offset from the right tab along a longitudinal direction of the air jet cooling tube.

According to one embodiment of the invention, the left tab has a left free end portion for supporting the air jet cooling tube, wherein the left free end portion for supporting the air jet cooling tube extends obliquely towards the right, and/or the right tab has a right free end portion for supporting the air jet cooling tube, wherein the right free end portion for supporting the air jet cooling tube extends obliquely towards the left.

According to one embodiment of the invention, the left tab comprises a first median portion, which is connected to the first inner face and which occupies a first angular sector, the first angular sector being disposed facing the first support, the left free end portion being connected to the first median portion and forming a second angular sector around the air jet cooling tube, the second angular sector being intended to be disposed facing the outer surface of the turbomachine casing, the right tab comprises a second median portion, which is connected to the second inner face and which occupies a third angular sector, the third angular sector being disposed facing the second support, the right free end portion being connected to the second median portion and forming a fourth angular sector around the air jet cooling tube, the fourth angular sector being intended to be disposed facing the outer surface of the turbomachine casing.

According to one embodiment of the invention, the left free end portion of the left tab and the right free end portion of the right tab each comprise a first radially inner free end, and the air jet cooling tube comprises a second radially inner free end, the second radially inner free end of the air jet tube being located radially under the first radially inner free end of each of the left tab and of the right tab.

According to one embodiment of the invention, the second angular sector around the air jet cooling tube extends from 180° to a maximum end value less than or equal to 250° and/or the fourth angular sector extends from 0° to a maximum end value greater than or equal to −55°, the angular sectors being referenced with respect to a point of the tube, which is turned towards the casing and which is taken at 270°.

According to one embodiment of the invention, the first support is placed against the second support along a longitudinal direction of the air jet cooling tube.

According to one embodiment of the invention, the first support comprises at least a first sliding portion, the second support comprises at least a second sliding portion, able to slide against the first sliding portion along a transverse direction between the right and the left and/or along a longitudinal direction of the air jet cooling tube up to a mounting position, in which the left tab and the right tab are located against respectively the left and the right of the air jet cooling tube, the first and second fastening means making it possible to immobilize the first and second supports in the mounting position.

According to one embodiment of the invention, the first support or the second support comprises at least one sliding stop abutment, configured to stop a sliding of the second support or of the first support along the transverse direction in the mounting position, and/or the first support or the second support comprises at least another sliding stop abutment, configured to stop a sliding of the second support or of the first support along the longitudinal direction of the air jet cooling tube in the mounting position.

According to one embodiment of the invention, the first support comprises a plurality of left tabs for partially retaining towards the left respectively a plurality of air jet cooling tubes, the second support comprises a plurality of right tabs for partially retaining towards the right respectively the plurality of air jet cooling tubes, the plurality of air jet cooling tubes being distributed between the right and the left, the left tabs being distributed between the right and the left, the right tabs being distributed between the right and the left.

According to one embodiment of the invention, the left tabs are distributed one behind the other along a transverse direction between the right and the left and/or the right tabs are distributed one behind the other along the transverse direction.

According to one embodiment of the invention, the first inner face is planar and/or the second inner face is planar.

A second subject matter of the invention is a method for mounting at least one air jet cooling tube on a turbomachine casing using the maintaining device as described above, that the method having the steps of:

during a first step, positioning the at least one air jet cooling tube around an outer surface of the turbomachine casing, during a second step after the first step, positioning the first support of the maintaining device to place the left tab against the left of the air jet cooling tube, during a third step after the second step, fastening the first support to a first flange of the turbomachine casing, during a fourth step after the third step, positioning the second support of the maintaining device against the first support to place the right tab against the right of the air jet cooling tube, during a fifth step after the fourth step, fastening the second support to a second flange of the turbomachine casing.

Figure 2:
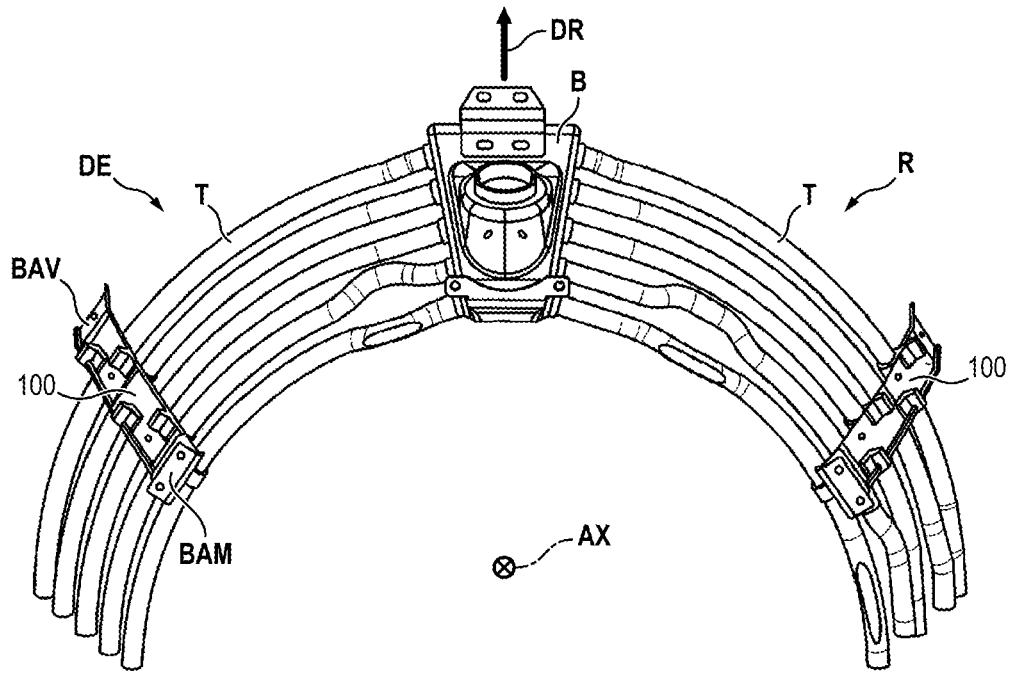
Figure 3:
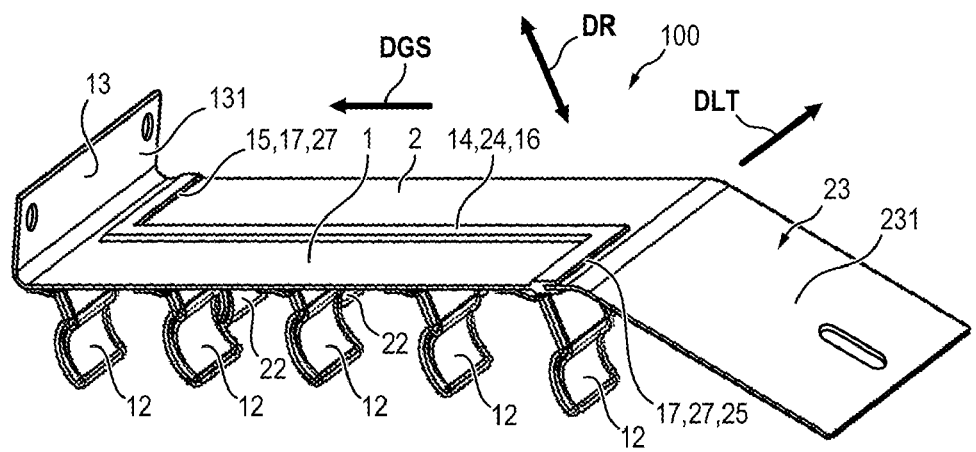
Figure 4:
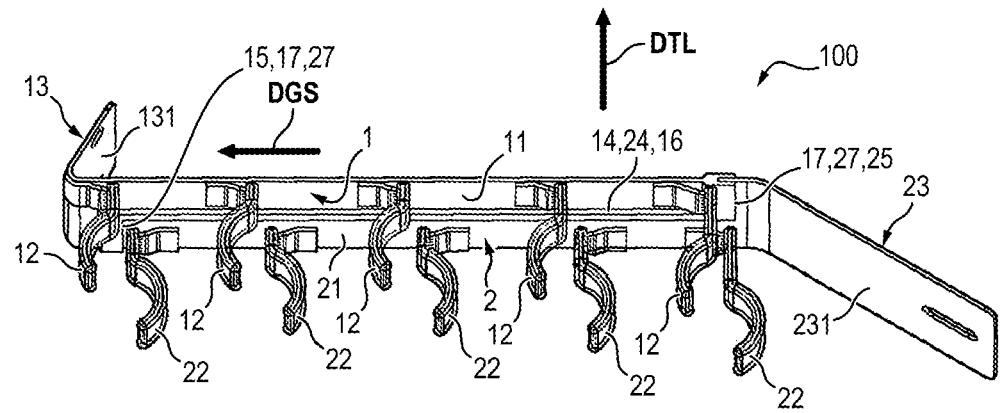
Figure 5:
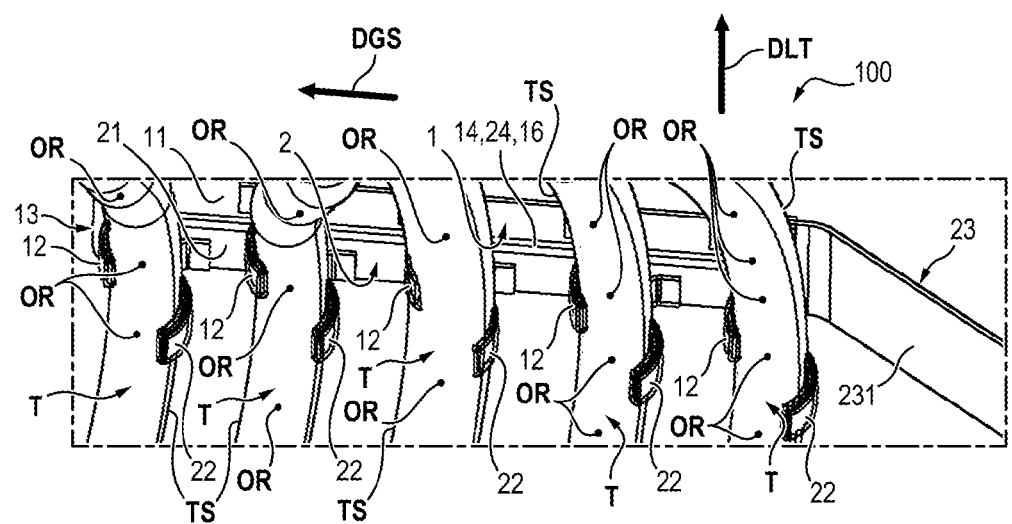
Figure 6:
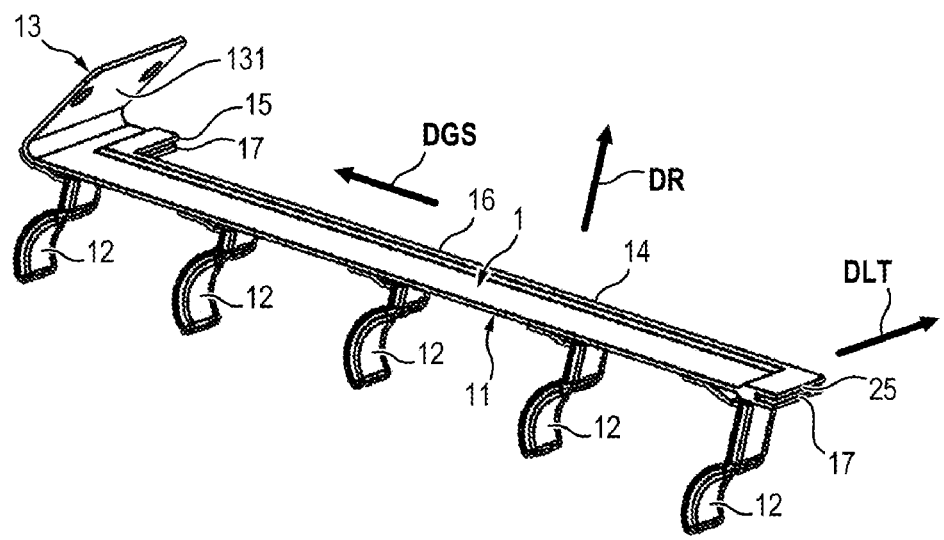
Figure 7:
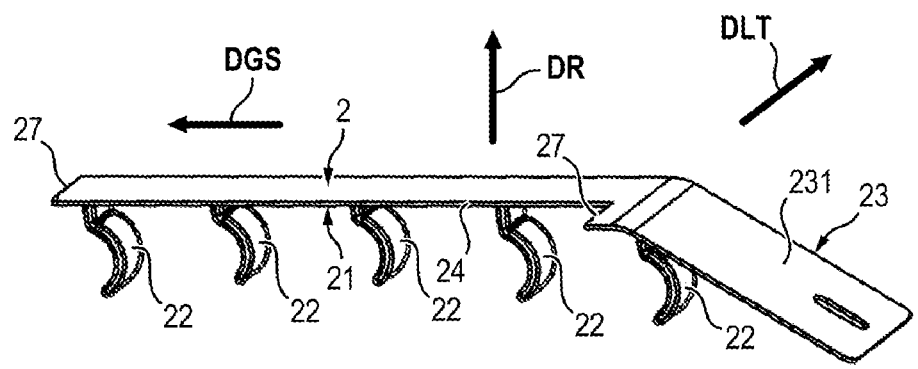
Figure 8:
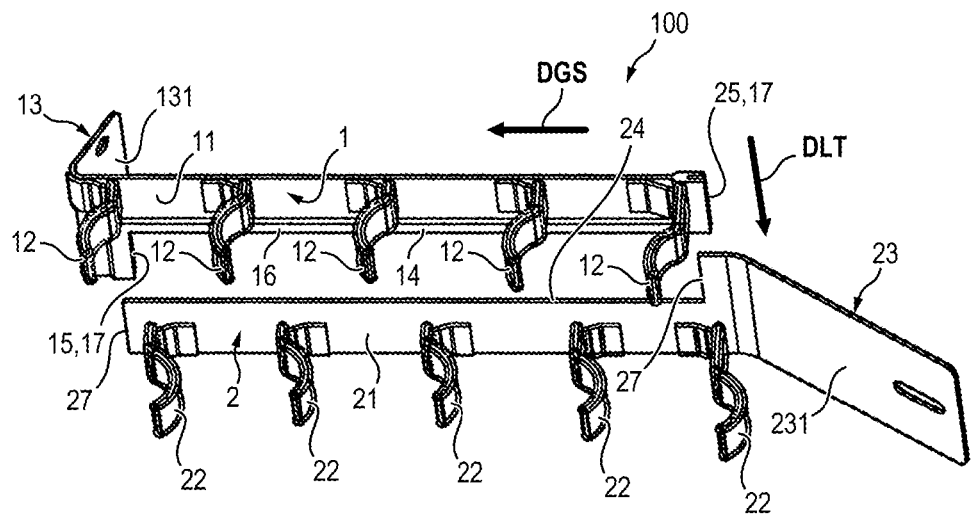
Figure 9:
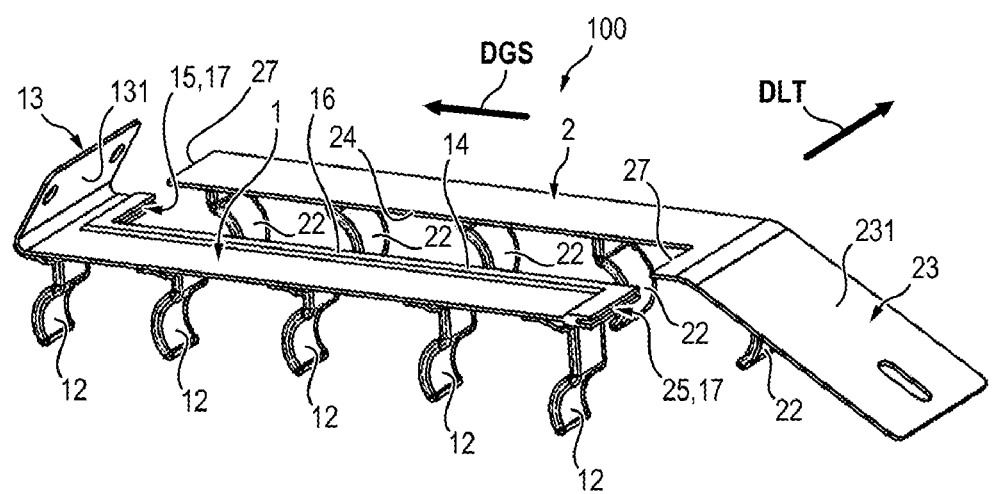
Figure 10:
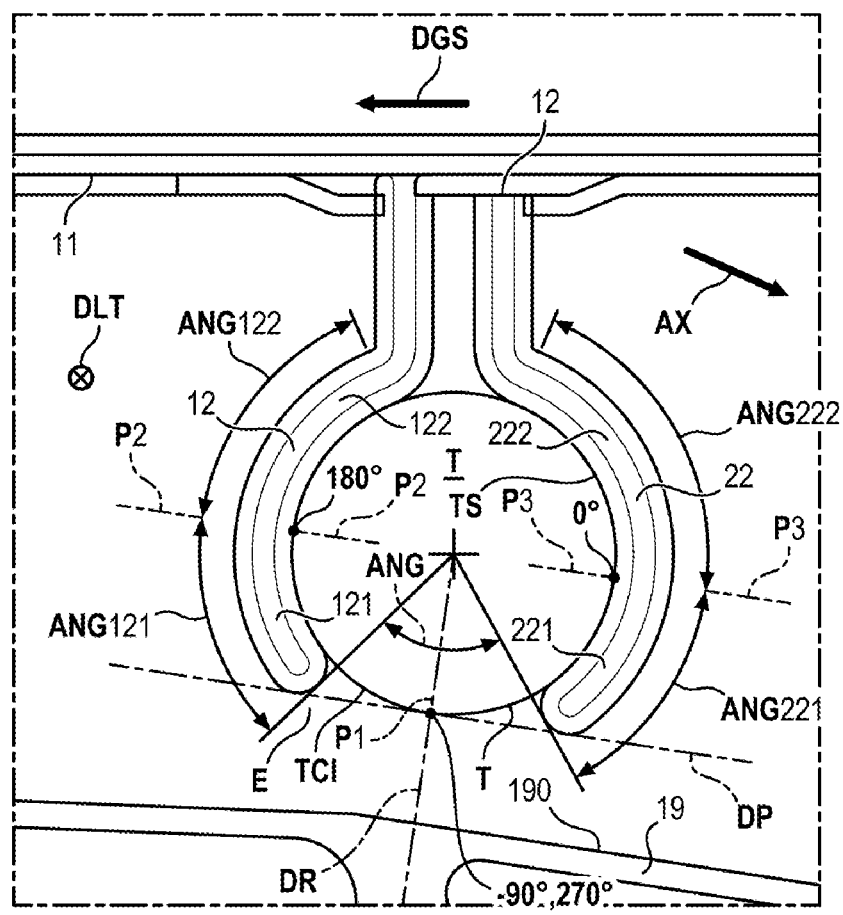
Figure 11:
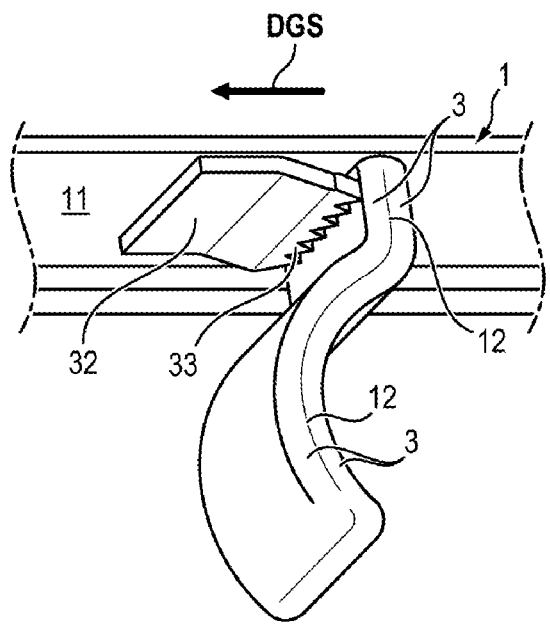
Figure 12:
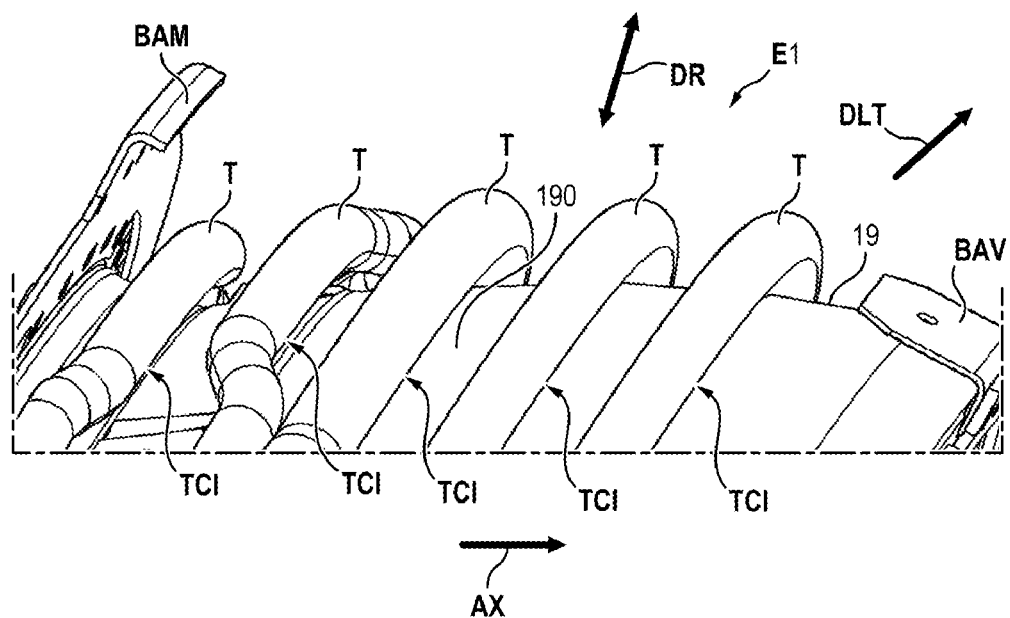
Figure 13:
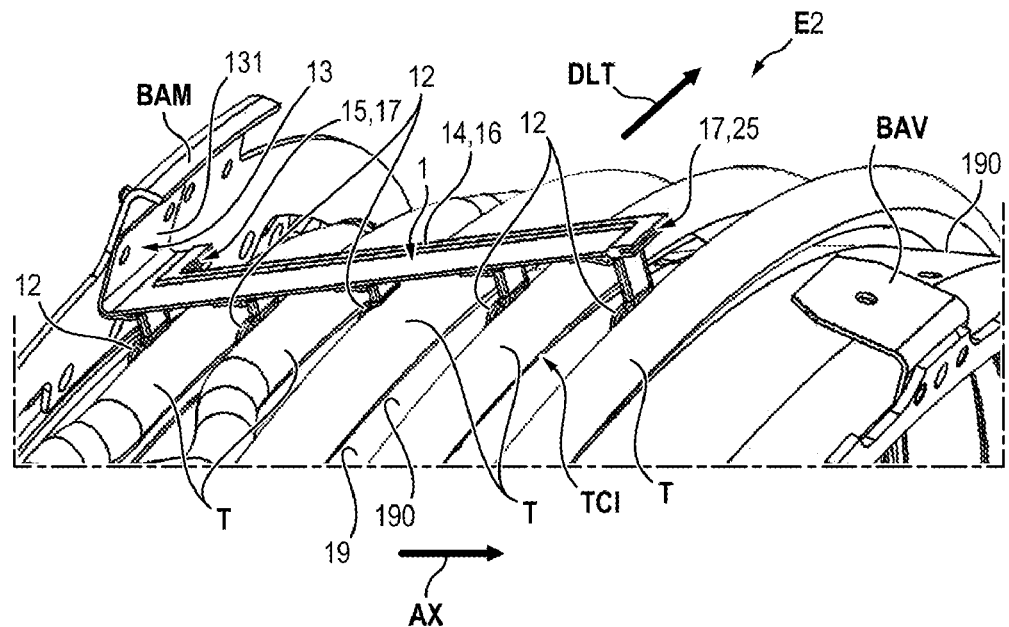
Figure 14:
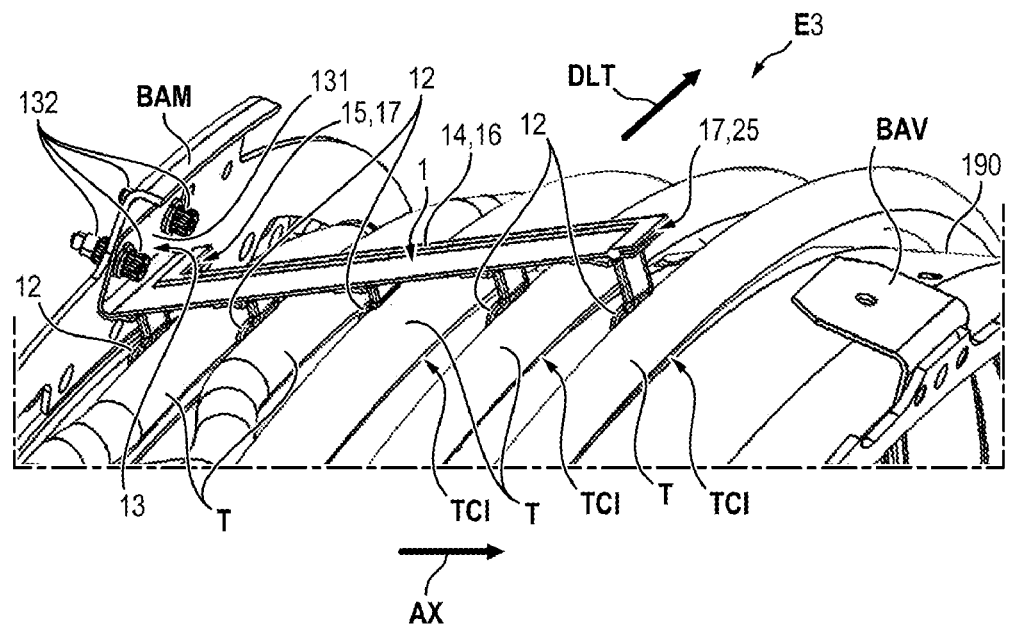
Figure 15:
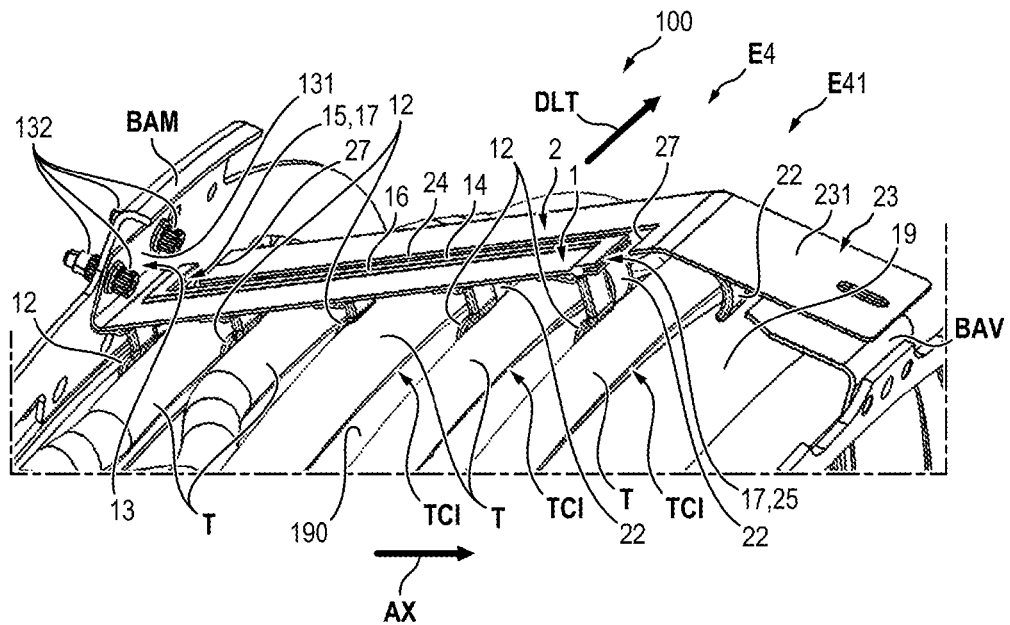
Figure 16:
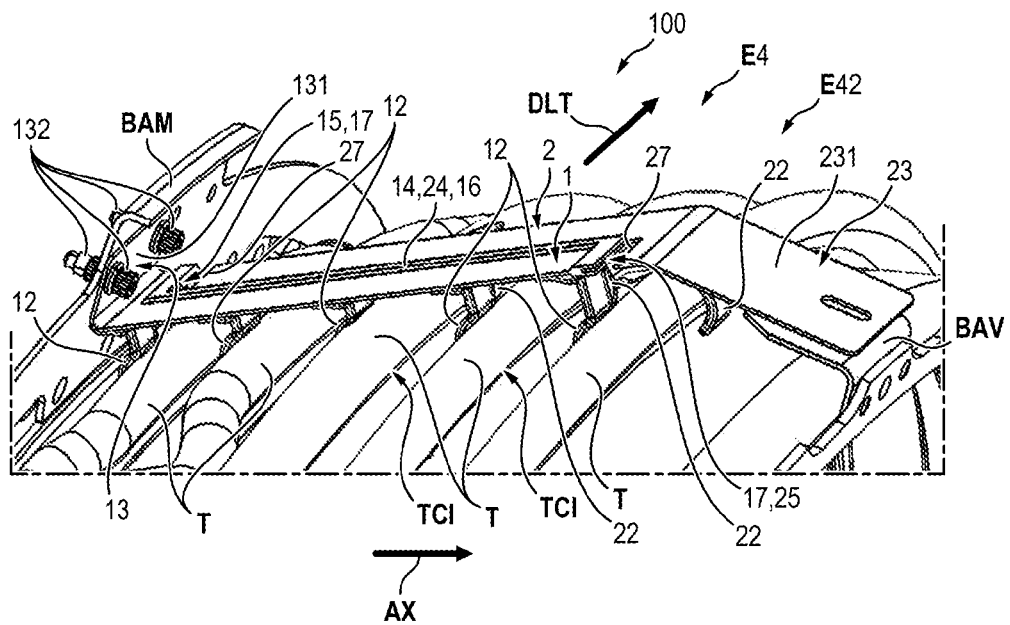
Figure 17:
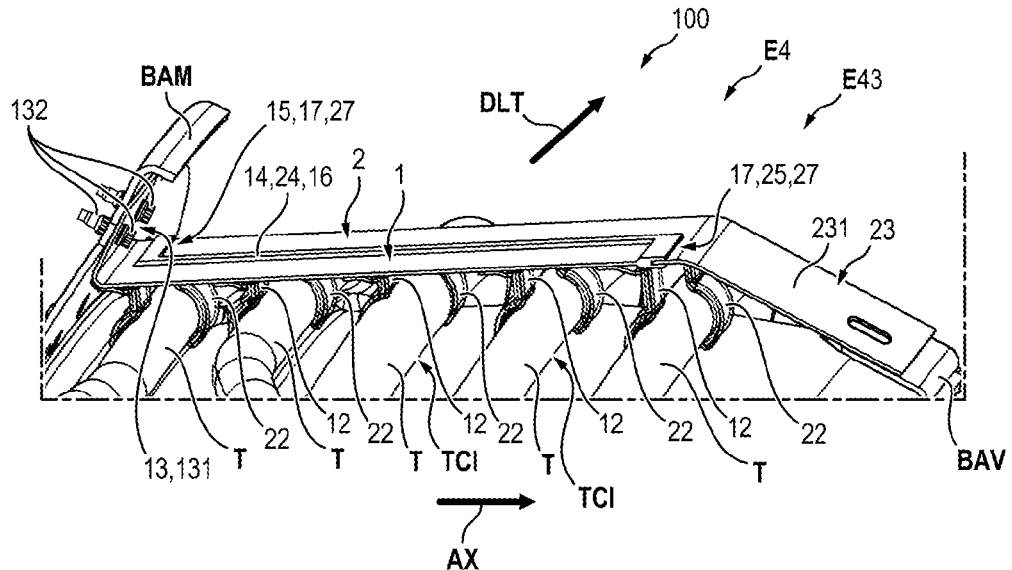
Figure 18:
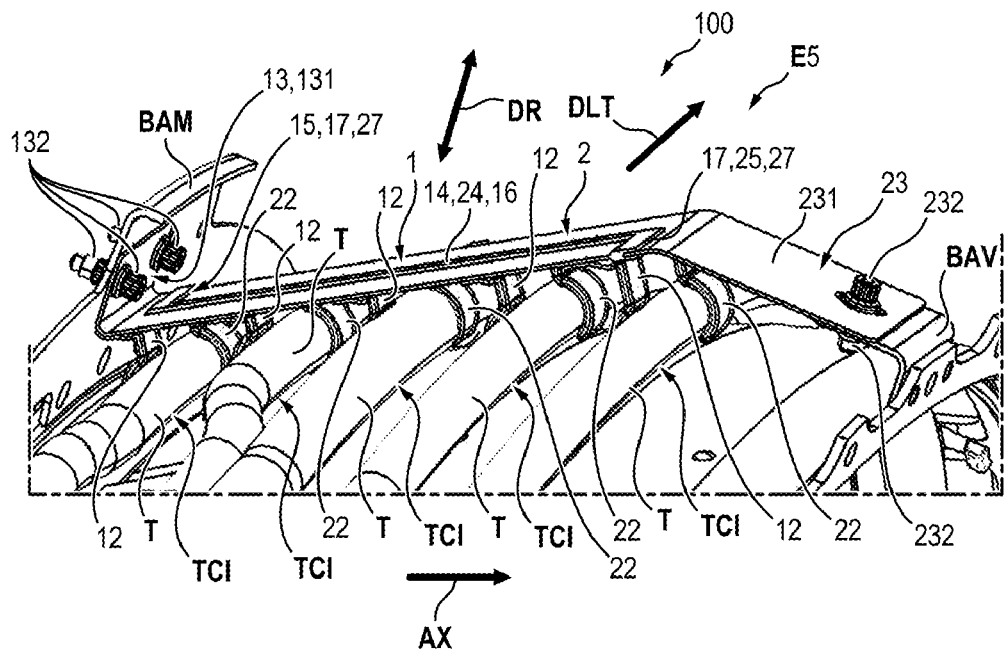
Figure 19:
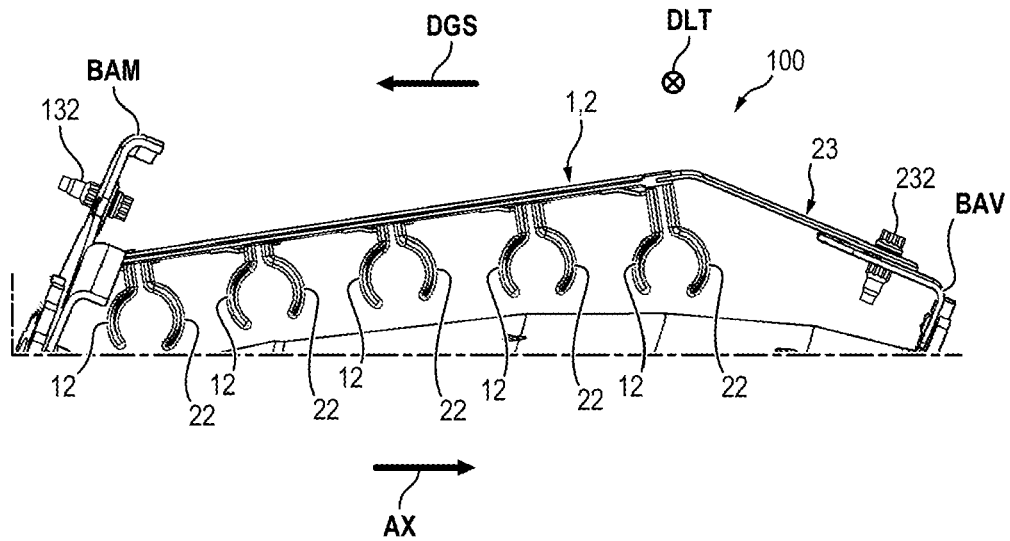
Figure 20:
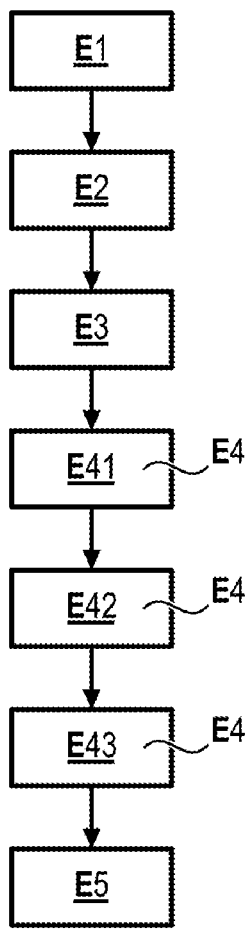

The invention will be better understood upon reading the following description, given only by way of non-limiting example with reference to the figures of the appended drawings, in which:

FIG. 1 schematically represents in axial cross-section one example of a turbomachine on which the maintaining device and the mounting method can be used according to the invention, FIG. 2 schematically represents in an upstream view one embodiment of an air-sending device, which can be part of the turbomachine, FIG. 3 schematically represents in a perspective top view a device for maintaining at least one cooling tube according to one embodiment of the invention in the mounted state, FIG. 4 schematically represents in a perspective bottom view a device for maintaining at least one cooling tube according to one embodiment of the invention in the mounted state, FIG. 5 schematically represents in a perspective bottom view a device for maintaining at least one cooling tube according to one embodiment of the invention in the mounted state, FIG. 6 schematically represents in a perspective top view a first support of the device for maintaining at least one cooling tube according to one embodiment of the invention, FIG. 7 schematically represents in a perspective top view a second support of the device for maintaining at least one cooling tube according to one embodiment of the invention, FIG. 8 schematically represents in a perspective bottom view the device for maintaining at least one cooling tube according to one embodiment of the invention in the dismounted state, FIG. 9 schematically represents in a perspective top view the device for maintaining at least one cooling tube according to one embodiment of the invention in the dismounted state, FIG. 10 schematically represents in a view in a transverse plane a tab of the first support cooperating with a tab of the second support of the device for maintaining a cooling tube according to one embodiment of the invention, FIG. 11 schematically represents in a perspective bottom view a tab of the device for maintaining at least one cooling tube according to one embodiment of the invention, FIG. 12 schematically represents in a perspective top view at least one cooling tube during a step of mounting on the casing, FIG. 13 schematically represents in a perspective top view the device for maintaining at least one cooling tube according to one embodiment of the invention during a step of mounting on the casing, after that of FIG. 12, FIG. 14 schematically represents in a perspective top view the device for maintaining at least one cooling tube according to one embodiment of the invention during a step of mounting on a casing, after that of FIG. 13, FIG. 15 schematically represents in a perspective top view the device for maintaining at least one cooling tube according to one embodiment of the invention during a step of mounting on a casing, after that of FIG. 14, FIG. 16 schematically represents in a perspective top view the device for maintaining at least one cooling tube according to one embodiment of the invention during a step of mounting on a casing, after that of FIG. 15, FIG. 17 schematically represents in a perspective top view the device for maintaining at least one cooling tube according to one embodiment of the invention during a step of mounting on a casing, after that of FIG. 16, FIG. 18 schematically represents in a perspective top view the device for maintaining at least one cooling tube according to one embodiment of the invention during a step of mounting on a casing, after that of FIG. 17, FIG. 19 schematically represents in a view in a transverse plane the device for maintaining a cooling tube according to one embodiment of the invention in the mounted state, without representing the cooling tubes, FIG. 20 schematically represents a flow diagram of one example of a method for mounting a cooling tube using the device for maintaining a cooling tube according to one embodiment of the invention.

One example of a turbomachine 10 is described below in more detail with reference to FIG. 1, on which can be used the device 100 for maintaining at least one cooling tube T outside an outer surface 190 of a casing of this turbomachine 10 according to the invention.

As known, the turbomachine 10 represented in FIG. 1 is intended to be installed on an aircraft, not represented, to propel it through the air.

The gas turbine engine or turbomachine 10 assembly has an axis AX, oriented from upstream to downstream or from front to back or from left to right in the following. The direction from the inside to the outside is the radial direction DR from the axis AX. The term "axially" refers to a direction along the axis AX. An axial plane is a plane containing the axis AX. A direction located in a plane transverse to the axis AX is called transverse direction.

The turbomachine 10 is for example a turbomachine having a double body. The turbomachine 10 comprises a fan assembly 28 and a central gas turbine engine 130. The central gas turbine engine 130 comprises, from upstream to downstream in the gas flowing direction, a low-pressure compressor CBP1, a high-pressure compressor CHP1, a combustion chamber 160, a high-pressure turbine THP1 and a low-pressure turbine TBP1 which delimit a primary gas flow FP1. The fan assembly 28 comprises a set of fan blades extending radially outwardly from a rotor 250. The turbomachine 10 has an upstream intake end 29 and a downstream exhaust end 31. The turbomachine 10 also comprises an inter-flowpath casing 36 which delimits a primary flowpath in which circulates the primary flow FP1 which passes through the high-pressure compressor CHP1, the high-pressure turbine THP1 and the low-pressure turbine TBP1.

The inter-flowpath casing 36 comprises, from upstream to downstream, a casing 361 of the low-pressure compressor CBP1, an intermediate casing 260, which is interposed between the low-pressure compressor CBP1 and the high-pressure compressor CHP1, a casing 362 of the high-pressure compressor CHP1, a casing 363 of the high-pressure turbine THP1 and a casing 19 of the low-pressure turbine TBP1.

The high-pressure turbine THP1 is secured to the high-pressure compressor CHP1 so as to form a high-pressure body, while the low-pressure turbine TBP1 is secured to the low-pressure compressor CBP1 so as to form a low-pressure body, so that each turbine drives the associated compressor in rotation about the axis AX under the effect of the thrust of the gases coming from the combustion chamber 160.

In operation, the air flows through the fan assembly 28 and a first portion FP1 (primary flow FP1) of the air flow is conveyed through the high-pressure compressor CHP1, in which the air flow is compressed and sent to the combustion chamber 160. The hot combustion products (not represented in the figures) coming from the combustion chamber 160 are used to drive the turbines THP1 and TBP1 and thus produce the thrust of the turbomachine 10. The turbomachine 10 also comprises a secondary flowpath 39 which is used to make a secondary flow FS1 of the air flow discharged from the fan assembly 28 pass around the inter-flowpath casing 36. More specifically, the secondary flowpath 39 extends between an inner wall 201 of a fan cowl 30 or nacelle 30 and the inter-flowpath casing 36 surrounding the central gas turbine engine 130. Arms 34 connect the intermediate casing 260 to the inner wall 201 of the cowl 30 in the secondary flowpath 39 of the secondary flow FS1.

With reference to FIGS. 2 to 20, the maintaining device 100 according to the invention allows maintaining one or several cooling tubes T or one or several cooling ramps R, at a certain distance radially above the outer surface 190 of the casing and comprises means for fastening to this casing, this casing belonging to the inter-flowpath casing 36, this casing being in particular the casing 19 of the low-pressure turbine TBP1 in the embodiments described below and which may alternatively be one among the casing 361 of the low-pressure compressor CBP1, the intermediate casing 260, the casing 362 of the high-pressure compressor CHP1, the casing 363 of the high-pressure turbine THP1 and the casing 19 of the low-pressure turbine TBP1.

The casing is cooled by using the impingement cooling technology. Each cooling tube T and/or each cooling tube R is of the air jet type. To this end, each cooling tube T is pierced with a series of orifices OR, which are distributed over its length and which open towards the outer surface 190 of the casing 19. Each cooling ramp R can be formed of one or several cooling tubes T connected together and extending in a same transverse plane. Each cooling tube T has, in an axial plane, a curved for example rounded or circular external surface TS. Each cooling tube T can be metallic, for example made of steel. Each cooling tube T is bent and extends transversely over a certain angular range around the casing 19, for example over approximately 90°, namely about the axis AX. An air-sending device DE is provided to send pressurized air into the cooling tube(s) T and thus to project the pressurized air jets through their orifices OR against the outer surface 190 of the casing 19. The pressurized air passing through these orifices OR ensures ventilation by impingement of the casing 19. For example, several cooling tubes T disposed axially side by side are provided. There are for example provided several angular ranges which surround the casing 19 and within each of which one or several cooling tubes T disposed axially side by side are located, for example four angular ranges of approximately 90° each. In the exemplary embodiment represented in FIGS. 1 to 20, the casing 19 of the low-pressure turbine TBP1 is of general shape having an outer surface 190 widening from upstream to downstream, for example substantially frustoconical, and the cooling tubes T are disposed in axially side by side transverse planes, having with respect to the axis AX of the casing 19 a radial distance increasing from upstream to downstream to follow the outer surface 190.

The radial clearances of the low-pressure turbine TBP1 between its rotor (the vane tips, not represented) and the casing 19 (the sealing sectors, not represented) surrounding this rotor are managed by cooling of the casing 19 on which the sealing sectors are fastened. This system for cooling the casing of the low-pressure turbine TBP1 can be of the LPTCC (Low Pressure Turbine Clearance Control) type or of the LPTACC (Low Pressure Turbine Active Clearance Control) type.

Air is collected from the secondary flow FS1 at the low-pressure compressor CBP1, then is conveyed to the cooling ramps R and/or to the cooling tube(s) T via the various elements described below of the air-sending device DE.

In the case of an LPTCC-type cooling system, the flow rate in the system is directly proportional to the flow rate in the secondary flow (the collection flow rate).

In an LPTACC-type cooling system, the flow rate is controlled via a motorized valve connected to the computer according to the flight phases (takeoff, climb, cruise, etc.).

For example, in the case of the LPTACC-type cooling system, the air-sending device DE comprises:

a valve, which is positioned upstream of the low-pressure turbine TBP1 and which calibrates the flow rate necessary for the control of the clearances of the low-pressure turbine TBP1 via a computer according to the flight phases, a pipe, which conveys the cooling air from the valve to the low-pressure turbine TBP1, and more particularly to the housings B, one or several pressurized air supply housings B, each connected to one or several cooling ramps R located on either side of each of the housings B and fastened thereon. The housings B act as a collector and distribute the air obtained in the ramps R.

one or several cooling ramps R, which each comprise one or several cooling tubes T, which are pierced on their portion opposite the casing 19 and which project the cooling air onto the outer surface 190 of the casing 19, in order to reduce its temperature, consequently its diameter and therefore the overall diameter of the stator opposite the rotor.

In one exemplary embodiment, the casing 19 is equipped with two housings B, positioned at approximately 180° from one another (only one being visible in FIG. 2). Each housing B is equipped for example with five ramps R. Each ramp R comprises for example two cooling tubes T fastened on either side of the housing B.

In FIGS. 18 and 19, it can be seen that the devices 100 for maintaining the cooling ramps R or cooling tubes T are fastened to the casing 19 by an upstream flange BAM and by a downstream flange BAV. Although not represented, the housings B are fastened on the casing 19 in the same way.

For example, only one maintaining device 100 is provided per cooling tube T. One or several maintaining devices 100, for example four maintaining devices 100, can be provided around the casing 19. Only one maintaining device 100 can be provided per angular range of several cooling tubes T disposed axially side by side.

The maintaining device 100 according to the invention is described in more detail below with reference to FIGS. 3 to 11.

The maintaining device 100 comprises a first support 1 supporting at least one tab 12 for bearing against the left of at least one cooling tube T and a second support 2 supporting at least one tab 22 for bearing against the right of this cooling tube T. The tab(s) 12 is/are called left tab(s) 12. The tab(s) 22 is/are called right tab(s) 22.

The first support 1 has a first inner face 11 turned towards the cooling tube T and towards the outer surface 190 of the casing 19. Each left tab 12 is fastened to the first inner face 11, which can for example be planar, of the support 1 and is located on the side thereof. The second support 2 has a second inner face 21 turned towards the cooling tube T and towards the outer surface 190 of the casing 19. Each right tab 22 is fastened to the second inner face 21, which can for example be planar, of the support 2 and is located on the side thereof. Each face 11 and/or 21 can be formed from a metal sheet.

Each left tab 12 is configured to partially retain the cooling tube T, that is to say to partially support radially the cooling tube T, namely towards the first inner face 11 and/or in both directions from inside to outside, and works from the left of the cooling tube T. Each right tab 22 is configured to partially retain radially the cooling tube T, that is to say to partially support the cooling tube T, namely towards the second inner face 21 and/or in both directions from inside to outside, and works from the right of the cooling tube T. The left tab 12 cooperates with the right tab 22 to retain the cooling tube T to the right and to the left, as well as radially, namely in the two directions from inside to outside.

The left tab 12 and the right tab 22 thus leave free the side TCI of the tube T turned towards the casing 19, that is to say turned radially inwardly. The left tab 12 and the right tab 22 are thus at a distance from the air jet orifices OR of the cooling tube T distributed on this side TCI of the tube T turned towards the casing 19. The cooling tube T can thus be brought closer to the casing 19 to have a smaller air-gap E, delimited directly between the cooling tube T and the casing 19, without portions of the maintaining device 100 encroaching on this air-gap E and therefore by avoiding fastening collars according to the state of the art from entering this air-gap. The tabs 12 and 22 are thus at a distance from the air-gap E delimited by the cooling tube T and the outer surface 190 of the casing 19, while making it possible to immobilize the cooling tube T in both directions of the radial direction DR. Obtaining a smaller air-gap E allows improving the cooling performances and therefore the performances of the turbine TBP1.

The maintaining device 100 comprises first means 13 for fastening the first support 1 to a first flange of the casing 19, and second means 23 for fastening the second support 2 to a second flange of the casing 19, the second fastening means 23 being distinct from the first fastening means 13. The first flange can be for example the upstream flange BAM and the second flange can be for example the downstream flange BAV, as represented in FIGS. 12 to 19. As a variant, the first flange can be for example the downstream flange BAV and the second flange can be for example the upstream flange BAM. The first fastening means 13 can comprise a first end wing 131 and one or several bolts 132 for fastening the first end wing 131 to the first flange. The second fastening means 23 can comprise a second end wing 231 and one or several bolts 232 for fastening the second end wing 231 to the second flange.

According to one embodiment of the invention, the left tab 12 is offset from the right tab 22 along a longitudinal direction DLT of the cooling tube T. For example, as represented in FIGS. 3, 4, 5, 12 to 18, the left tab 12 is entirely offset longitudinally from the right tab 22, that is to say no portion of the left tab 12 is facing the right tab 22 for the same cooling tube T. The term "longitudinally" designates a direction along the longitudinal direction DLT in which the cooling tube T extends around the casing 19, this longitudinal direction DLT being located in a transverse plane. For the cooling tube T bent around the casing 19, this longitudinal direction DLT is a circumferential or tangential direction with respect to the radial direction DR. The invention thus allows distributing the contact forces of the maintaining device 100 along the tube T.

According to one embodiment of the invention, the first support 1 comprises several left tabs 12 for partially retaining towards the left respectively several cooling tubes T distributed between the right and the left. The partial retention left tabs 12 are distributed from right to left radially under the support 1. The second support 2 comprises several right tabs 22 for partially retaining towards the right respectively these cooling tubes T distributed between the right and the left. The partial retention right tabs 22 are also distributed from right to left radially under the support 2. For example, as represented in FIGS. 3 to 9 and 12 to 19, the partial retention left tabs 12 are distributed one behind the other along a transverse direction DGS going from right to left and/or the partial retention right tabs 22 are distributed one behind the other along the transverse direction DGS. For example, there are provided five left tabs 12 located radially under the inner face 11 and five right tabs 22 located radially under the inner face 21, for retaining respectively five tubes T distributed from right to left.

According to one embodiment of the invention, the left tab 12 and/or the right tab 22 has a curved hook shape.

According to one embodiment of the invention, the left tab 12 has a left free end portion 121 for supporting the cooling tube T obliquely towards the right and towards the first inner face 11, and/or the right tab 22 has a right free end portion 221 for supporting the cooling tube T obliquely towards the left and towards the second inner face 21.

According to one embodiment of the invention, the left end portion 121 of the left tab 12 and the right end portion 122 of the right tab 22 each comprise a radially inner free end (free end of the portion 221 and free end of the portion 122), and the tube T comprises a radially inner free end, the radially inner free end of the tube T being located radially under the radially inner free end of each of the tabs 12, 22.

According to one embodiment of the invention, the left tab 12 comprises a first median portion 122, which is connected to the first inner face 11 and which occupies a first angular sector ANG122 disposed facing the first support 1. This first angular sector ANG122 goes up to 180° (point P2) around the cooling tube T, as illustrated in FIG. 10, where the angular values are referenced in an axial plane with respect to a point P1 located on the side TCI of the cooling tube T, turned towards the outer surface 190 of the casing 19 and which is taken in this case at 270° or −90°. The left free end portion 121 is connected to the first median portion 122. The left free end portion 121 forms a second angular sector ANG121 around the cooling tube T. This second angular sector ANG121 extends the first angular sector ANG122 inwardly and is intended to be disposed facing the outer surface 190 of the casing 19. This second angular sector ANG121 extends from 180° to a maximum end (free end) value, which is lower than 270° and which may be less than or equal to 250°, and in particular less than or equal to 235°.

Similarly, the right tab 22 comprises a second median portion 222, which is connected to the second inner face 21 and which occupies a third angular sector ANG222 disposed facing the second support 2. This third angular sector ANG222 goes up to 0° (point P3) around the cooling tube T. The right free end portion 221 is connected to the second median portion 222. The right free end portion 221 forms a fourth angular sector ANG221 around the cooling tube T. This fourth angular sector ANG221 extends the third angular sector ANG222 inwardly and is intended to be disposed facing the outer surface 190 of the casing 19. This fourth angular sector ANG221 extends from 0° to a maximum end (free end) value, which is greater than −90° and which may be greater than or equal to −70°, and in particular greater than or equal to −55°.

According to one embodiment of the invention, the left tab 12 and the right tab 22 extend up to a straight line DP, which is parallel to the outer surface 190 of the casing 19 and which is tangent to the cooling tube T, as represented for example in FIG. 10.

According to one embodiment of the invention, the left tab 12 and the right tab 22 delimit, for example, an inward opening angle ANG, which is greater than 40°, and for example greater than or equal to 70°, as represented for example in FIG. 10.

According to one embodiment of the invention, the left tab 12 (portion 121 and/or 122) has a rounded shape of contact with the left of the cooling tube T and is for example in the form of a portion of cylinder corresponding to the outer surface TS of the cooling tube T. The right tab 22 has a rounded shape (portion 221 and/or 222) of contact with the right of the cooling tube T and is for example in the form of a portion of cylinder corresponding to the outer surface TS of the cooling tube T.

According to one embodiment of the invention, the first support 1 is distinct from the second support 2. The first support 1 is placed against the second support 2 at least along the longitudinal direction DLT of the cooling tube T and for example also along the transverse direction DGS between the right and the left.

According to one embodiment of the invention, as illustrated in FIGS. 3 to 9 and 13 to 16, the first support 1 comprises at least a first sliding portion 14 and/or 17. The second support 2 comprises at least a second sliding portion 24, able to slide against the first sliding portion 14 along the transverse direction DGS going between the right and the left up to a mounting position and/or at least a second sliding portion 27, able to slide against the first sliding portion 17 along the longitudinal direction DLT of the cooling tube T up to the mounting position. In the mounting position, the left tab 21 and the right tab 22 are located against respectively the left and the right of the cooling tube T, as described above. The first and second fastening means 13, 23 allow immobilizing the first and second supports 1, 2 in the mounting position. The sliding portions thus allow guiding the mounting of the supports 1 and 2 against each other. The first sliding portion 14 and/or 17 can be a female sliding portion, in which the second sliding portion 24 and/or 27 is able to slide, or conversely the second sliding portion 24 and/or 27 can be a female sliding portion, in which the first sliding portion 14 and/or 17 is able to slide.

According to one embodiment of the invention, as illustrated in FIGS. 3 to 9 and 13 to 16, the first support 1 comprises at least one sliding stop abutment 15 and/or 25, configured to stop the sliding of the second support 2 along the transverse direction DGS up to the mounting position. The abutment 15 can be formed by the first sliding portion 17. As a variant, the second support 2 comprises at least one sliding stop abutment, configured to stop the sliding of the first support 1 along the transverse direction DGS up to the mounting position. This abutment can be formed by the second sliding portion 27.

According to one embodiment of the invention, as illustrated in FIGS. 3 to 9 and 13 to 16, the first support 1 comprises at least another sliding stop abutment 16, configured to stop the sliding of the second support 2 along the longitudinal direction DLT of the cooling tube T up to the mounting position. The other abutment 16 can be formed by the first sliding portion 14.

As a variant, the second support 2 comprises at least another sliding stop abutment, configured to stop the sliding of the first support 1 along the longitudinal direction DLT of the cooling tube T up to the mounting position. This other abutment can be formed by the second sliding portion 24.

According to one embodiment of the invention, the support 1 and/or the support 2 can be for example a sheet on which the left tab(s) 12 and/or the right tab(s) 22 are extruded via additive metal manufacture. Of course, the left tab(s) 12 and/or the right tab(s) 22 can also be conventionally manufactured (mechanically welded assembly or the like).

According to one embodiment of the invention, as illustrated in FIG. 11, each left tab 12 and/or each right tab 22 is covered with a damping shell 3 made of a flexible material (for example silica wool or the like). This prevents damaging the tubes T during the mounting or in the cases of abnormal operation. Each shell 3 can be retained on the left tab 12 and/or on the right tab 22 by a toothed plate 32, which is fastened (for example by welding) to the first inner face 11 or to the second inner face 21 and whose teeth 33 press against shell 3.

One example of the method for mounting the cooling tube(s) T on the casing 19 of the turbomachine 10 using the maintaining device 100 described above is described below with reference to FIG. 20.

During a first step E1 represented in FIG. 12, the cooling tube(s) T is/are positioned around the outer surface 190 of the casing 19 of the turbomachine. This positioning is for example carried out by installing the housing(s) B on the casing 19 and/or by installing the air-sending device DE on the turbomachine 10.

Then, during a second step E2 after the first step E1 and represented in FIG. 13, the first support 1 is positioned to place the left tab(s) 12 against the left of the cooling tube(s).

During a third step E3 after the second step E2 and represented in FIG. 14, the first support 1 is fastened to the first flange (for example BAM) of the casing 19 by the first fastening means 13, for example using the bolt(s) 132, as described above.

During a fourth step E4 after the third step E3 and represented in FIGS. 15 to 17, the second support 2 of the maintaining device 100 is positioned against the first support 1 to place the right tab 22 against the right of the cooling tube T. This fourth step E4 comprises for example firstly a first sub-step E41 (represented in FIG. 15) for bringing the second support 2 away from the support 1 to pass the right tab(s) 22 at a distance from the tubes T and between the tubes T, then a second sub-step E42 (represented in FIG. 16) of clamping the second sliding portion 24 against the first sliding portion 14 in the longitudinal direction DLT of the cooling tube T so that the second support 2 abuts against the other abutment 16, then a third sub-step E41 (represented in FIG. 17), in which the second sliding portion 24 of the second support 2 is slid along the transverse direction DGS from right to left against the first sliding portion 14 of the first support 1 until the second support 2 abuts against the abutment 15 and/or 25.

During a fifth step E5 after the fourth step E4 and represented in FIG. 18, the second support 2 is fastened to the second flange (for example BAV) of the casing 19 by the second fastening means 23, for example using bolt(s) 232, as described above.

This method allows a smooth mounting without risking of damaging the tubes and does not require flexibility in the tabs 12, 22 themselves, this flexibility being likely to cause their premature breakage and to lose the mechanical strength of the tube T.

In addition, the invention allows removing screws and therefore allows a gain in mass. In addition, as the diameter of the ramps is conditioned by the passage of the tools allowing the assembly of the maintaining device and of the screws on the ramp support, these diameters can be increased.

Of course, the embodiments, features, possibilities and examples above can be combined with each other or be selected independently of each other.

The invention claimed is:

1. A maintaining device for maintaining at least one air jet cooling tube, the air jet cooling tube being intended to cool an outer surface of a turbomachine casing,
   wherein the maintaining device comprises
   a first support, comprising a first inner face turned towards the air jet cooling tube and at least one left tab for partially retaining towards the left the air jet cooling tube, located on a side of the first inner face and fastened thereto,
   a second support, comprising a second inner face turned towards the air jet cooling tube and at least one right tab for partially retaining towards the right the air jet cooling tube, located on a side of the second inner face and fastened thereto,
   first fastening means for fastening the first support to a first flange of the turbomachine casing,
   second fastening means for fastening the second support to a second flange of the turbomachine casing, the second fastening means being distinct from the first fastening means.

2. The device according to claim 1, wherein the left tab is offset from the right tab along a longitudinal direction of the air jet cooling tube.

3. The device according to claim 1, wherein the left tab has a left free end portion for supporting the air jet cooling tube, wherein the left free end portion for supporting the air jet cooling tube extends obliquely towards the right,
   and/or the right tab has a right free end portion for supporting the air jet cooling tube, wherein the right free end portion for supporting the air jet cooling tube extends obliquely towards the left.

4. The device according to claim 3, wherein the left tab comprises a first median portion, which is connected to the first inner face and which occupies a first angular sector, the first angular sector being disposed facing the first support,
   the left free end portion being connected to the first median portion and forming a second angular sector around the air jet cooling, the second angular sector being intended to be disposed facing the outer surface of the turbomachine casing,
   the right tab comprises a second median portion, which is connected to the second inner face and which occupies a third angular sector, the third angular sector being disposed facing the second support,
   the right free end portion being connected to the second median portion and forming a fourth angular sector around the air jet cooling tube, the fourth angular sector being intended to be disposed facing the outer surface of the turbomachine casing.

5. The device according to claim 4, wherein the left free end portion of the left tab and the right free end portion of the right tab each comprise a first radially inner free end, and the air jet cooling tube comprises a second radially inner free end, the second radially inner free end of the air jet tube being located radially under the first radially inner free end of each of the left tab and of the right tab.

6. The device according to claim 1, wherein the first support is placed against the second support along a longitudinal direction of the air jet cooling tube.

7. The device according to claim 1, wherein the first support comprises at least a first sliding portion, the second support comprises at least a second sliding portion, able to slide against the first sliding portion along a transverse direction between the right and the left and/or along a longitudinal direction of the air jet cooling tube up to a mounting position, in which the left tab and the right tab are located against respectively the left and the right of the air jet cooling tube, the first and second fastening means making it possible to immobilize the first and second supports in the mounting position.

8. The device according to claim 7, wherein the first support or the second support comprises at least one sliding stop abutment, configured to stop a sliding of the second support or of the first support along the transverse direction in the mounting position, and/or the first support or the second support comprises at least another sliding stop abutment, configured to stop a sliding of the second support or of the first support along the longitudinal direction of the air jet cooling tube in the mounting position.

9. The device according to claim 1, wherein the first support comprises a plurality of left tabs for partially retaining towards the left respectively a plurality of air jet cooling tubes,
- the second support comprises a plurality of right tabs for partially retaining towards the right respectively the plurality of air jet cooling tubes,
- the plurality of air jet cooling tubes being distributed between the right and the left,
- the left tabs being distributed between the right and the left,
- the right tabs being distributed between the right and the left.

10. The device according to claim 9, wherein the left tabs are distributed one behind the other along a transverse direction between the right and the left and/or the right tabs are distributed one behind the other along the transverse direction.

11. The device according to claim 1, wherein the first inner face is planar and/or the second inner face is planar.

12. A method for mounting at least one air jet cooling tube on a turbomachine casing using the maintaining device according to claim 1,
that the method having the steps of:
- during a first step, positioning the at least one air jet cooling tube around an outer surface of the turbomachine casing,
- during a second step after the first step, positioning the first support of the maintaining device to place the left tab against the left of the air jet cooling tube,
- during a third step after the second step, fastening the first support to a first flange (BAM) of the turbomachine casing,
- during a fourth step after the third step, positioning the second support of the maintaining device against the first support to place the right tab against the right of the air jet cooling tube,
- during a fifth step after the fourth step, fastening the second support to a second flange of the turbomachine casing.

* * * * *